UNITED STATES PATENT OFFICE.

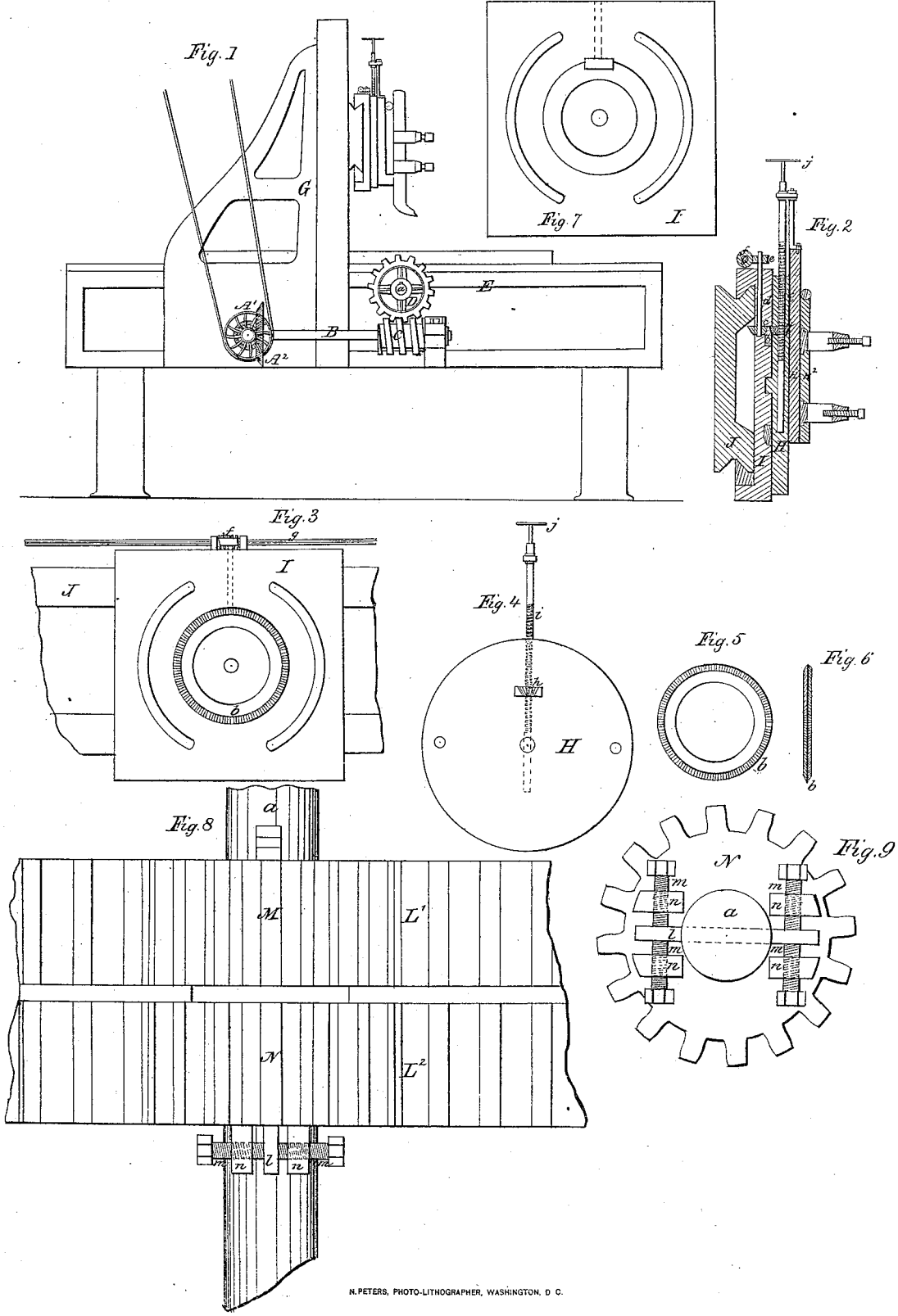

THOS. H. BURRIDGE, OF JERSEY CITY, NEW JERSEY.

MEANS FOR PREVENTING BACKLASH IN THE FEED-MOTION OF PLANING-MACHINES.

Specification of Letters Patent No. 7,852, dated December 24, 1850.

*To all whom it may concern:*

Be it known that I, THOMAS H. BURRIDGE, of Jersey City, in the county of Hudson and State of New Jersey, have invented new and useful Improvements on the Machine for Planing Iron and other Metals; and I do hereby declare that the following is a full, clear, and exact description of the construction and operation of the same, reference being had to the accompanying drawings, Sheets 1 and 2, making a part of this specification, in which—

Figures 1, 2, 3, 4, 5, 6, 7, 8, and 9, Sheet 1, represents the machine and improvements in part and detail drawn and exhibited on different scales. Fig. 1, being a partial side elevation of the machine. Fig. 2, a transverse vertical section of the cross-slide, rest and vertical feed motion. Fig. 3, a front elevation of the ring bevel wheel in its recess and accompanying parts used in the rests. Fig. 4, a front elevation of the vertical feeding screw and its pinion, showing their position on the swivel plate of the rest. Figs. 5, 6, front and edge views of the ring bevel wheel referred to. Fig. 7, a front elevation of the sliding rest plate. Fig. 8, a plan of the racks, pinions and shaft for driving the table. Fig. 9, a side view of one of the driving pinions, being adjustable. Fig. 10, Sheet 2, is a perspective elevation of the driving pinions in gear with the racks on the traveling table.

The same letters of reference are used to denote the same parts in both sheets and in the several figures.

The nature of my invention consists in the use of two racks, placed parallel, and fixed to the traveling table, which racks, are driven by two separate pinions, on the same shaft, one of which is firmly keyed to the shaft and the other is fitted loose, but with a driving adjusting arrangement which will admit of the adjusting pinion being slightly moved and the shaft also slightly turned in the opposite direction, so that, when the teeth in the pinions and racks have too much play, caused by wear, the "backlash" consequent upon wear, in the ordinary way, is, by this adjusting arrangement, obviated, the pinions being set so that the teeth of either pinion will bear, only, on one of their sides against the teeth in the racks, one driving the table forward and the other backward alternately; the shaft on which are the pinions being driven by a screw and pinion.

To enable others skilled in the art to make and use my invention I will proceed to describe its construction and operation.

$A^1$, Fig. 1, Sheet 1, is a bevel wheel driven by band or otherwise, working into another wheel $A^2$, fitted on the shaft B, on which is a driving screw C, working a wheel or pinion D, keyed on a driving shaft $a$, E, is the frame or body of the machine on which the table travels or slides.

G, is one of the side uprights for carrying the cross slide and rest. $b$, Figs. 2, 3, 5, 6, Sheet 1, is a ring bevel wheel, with teeth on both of its angular edges, used in driving the vertical feeding screw in the rest and is fitted in and moves in a recess in the plate I, being driven by a bevel pinion $c$, on an upright spindle $d$, on the upper end of which is a screw pinion $e$, driven by a sliding screw $f$, fitted so as to slide on a grooved shaft $g$, which may be driven by the machine in any suitable or ordinary manner. $h$ is another small bevel pinion, working in the opposite edge or face of the ring wheel $b$, by which it is driven, it works on and operates a screw $i$, working in a suitable recess in the plate H, or the screw $i$, may be worked by hand through the wheel $j$. To the screw $i$ is attached the slide and tool holder $k^1$, $k^2$, which move up and down with the the screw $i$. H, is a swivel rest plate moving circularly, and I, a sliding plate, moving transversely with the machine on the slide J. Figs. 3, 4, 5, 6, and 7, Sheet 1, represent as already referred to at the commencement, the several parts and their positions, of the slide and rest, in detail, as described. Figs. 8, 9, Sheet 1, and Fig. 10, Sheet 2, represent two separate and distinct racks $L^1$, $L^2$, placed parallel and secured to the traveling table of the machine, which the racks $L^1$, $L^2$, serve to drive, the teeth of both racks may be in any relative position toward each other, either the teeth of one rack set in a line with the spaces formed by the teeth of the other rack, or the teeth of both may be in the same, or different, line with each other.

On the driving shaft $a$, are two separate pinions M, N, working into the two racks $L^1$, $L^2$, the pinion M, is firmly keyed to the shaft $a$, the pinion N, is put loose on the shaft $a$, but is secured to it, or driven, by a key $l$, passing through the shaft $a$, the key $l$, acting at opposite sides, on either extremity, against set screws $m$, $m$, $m$, $m$, passing through checks $n$, $n$, $n$, $n$, cast on the face of the pinion N, which is by these means made adjustable or may be readily moved or turned on the shaft $a$.

The operation is as follows: The table-driving shaft $a$, being made to revolve by means of a pinion D, screw C, wheels $A^1$, $A^2$, Fig. 1, Sheet 1, and the motion reversed in any suitable or ordinary way, the pinions M, N, Figs. 8 and 9, Sheet 1, and Fig. 10, Sheet 2, working with the shaft $a$, drive the table forward and when the motion of the shaft $a$, is reversed, work the traveling table back, by means of the racks $L^1$, $L^2$, secured to the table and which the pinions M, N, are in gear with, but the pinion N, being made adjustable, it can be slightly turned, at any time, on the shaft $a$, by turning the set screws $m$, $m$, $m$, $m$, passing through the cheeks $n$, $n$, $n$, $n$, and altering the line of the teeth on the pinions M, N, with regard to each other, so that the one pinion shall be, as if it were in advance of the other, the pinion M, keyed fast to the shaft, being made to press on one side only of the teeth in the rack $L^1$, thus driving the table in one direction, and the pinion N, being turned on the shaft $a$, through the set screws, as described, so that its teeth shall act, also on one side only against the teeth in the rack $L^2$ (pressing on the opposite sides of the teeth to the sides operated on in $L^1$), drives the table in a contrary direction, the key $l$, serving to drive the pinion N. Both pinions M, N, may be fitted in gear with the racks $L^1$, $L^2$, to work, together, the traveling table backward and forward when the machine is new, but as the teeth in the racks and pinions begin to wear and the several teeth have too much play, one within the other, so as to create a jerking motion or what by mechanics is called "backlash," more especially felt when the stroke or motion of the table is reversed, then by adjusting the pinion N, occasionally, in the manner described, so that its teeth will press or bear only on the rack $L^2$ to drive it, and the table in one direction and the pinion M, acting similarly, to work the table in a contrary direction, either pinion operating alternately to drive the table backward and forward, "backlash" is obviated and a much smoother motion is acquired, which, is further increased by the application of the screw C, and pinion D, Fig. 1, Sheet 1, operating the shaft $a$, working in combination with the adjusting arrangement described.

The operation of the rest, in a transverse direction, is similar to or may be the same as the motion in ordinary use, J, Sheet 1, serving for the cross slide on which the plate I, and rest moves in a line transversely with the machine.

The vertical and angular feed is produced by the ground shaft $g$, worked in the usual or any suitable way and which drives the screw $f$, turning the screw pinion $e$, bevel pinion $c$, ring bevel wheel $b$, and bevel pinion $h$, operating the vertical feeding screw $i$ to which is connected the cutting tools, being held in tool holders $k^1$, $k^2$. The groove in the shaft $g$, allows of the screw $f$, operating whatever may be the transverse movement of the rest and the ring wheel $b$, permits of the plate H, to swivel circularly so as to be set at any required angle according to the desired cut, the bevel pinion $h$, being not necessarily positioned in the same line as the pinion $c$, as shown in drawing, but may together with the screw $i$, and tool cutters form a different relative position, lying at another angle if required.

What I claim as my invention and desire to secure by Letters Patent, is—

The combination in the traveling-table motion, of planing machines, of two racks $L^1$, $L^2$, Sheets 1 and 2, operated on by two separate pinions M, N, one of which is made adjustable in the manner shown by set screws $m$, $m$, $m$, $m$, with accompanying parts. and so arranged, that the pinions M N, may be set as to alternately operate, the one to drive the table forwards and the other to drive it backwards for the purposes herein set forth and operating as shown and described, or in any manner substantially the same.

THOMAS H. BURRIDGE.

Witnesses:
S. H. WALES,
R. W. FENWICK.